_United States Patent Office_

3,324,124
Patented June 6, 1967

3,324,124
THIAMINE DERIVATIVES
Masuo Murakami, Kozo Takahashi, Yasubumi Hirata, and Hidenori Iwamoto, Tokyo, Japan, assignors to Yamanouchi Seiyaku K.K., Tokyo, Japan
No Drawing. Filed Aug. 16, 1965, Ser. No. 480,118
Claims priority, application Japan, Sept. 12, 1964, 39/51,992; Nov. 10, 1964, 39/63,189; Feb. 9, 1965, 40/6,772; Feb. 11, 1965, 40/7,232, 40/7,233; Mar. 24, 1965, 40/17,093
17 Claims. (Cl. 260—256.5)

This invention relates to novel thiol-type thiamine derivatives and more particularly to thiol-type thiamine derivatives having cyclic thiol carbonate structures wherein the S-position of the thiol group and the O-position of the β-hydroxyethyl group are bonded to the carbonyl group (—CO—) and the acid salts thereof, and further to a process for the production thereof. Furthermore, the invention relates to compositions containing the above compounds having pharmacological usefulness.

The above-mentioned thiol-type thiamine derivative of this invention is shown by the general formula

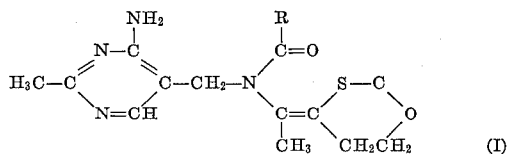

(I)

wherein R represents a hydrogen atom or an α-hydroxyethyl group and when R represents the α-hydroxyethyl group Formula I means the optically active d-form, l-form, and nonactive dl-form. In the case, when R is a hydrogen atom, the compound shown by the above Formula I can be called "carbothiamine" and if R is an α-hydroxyethyl group, the compound can be called "carbohydroxyethylthiamine."

Since the following thiol-type thiamine was reported by Zima et al. (Zima et al.: Ber., 73, 941 (1940))

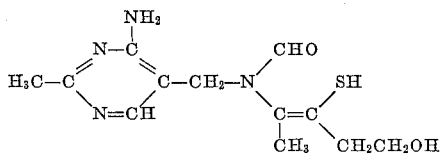

various thiol-type thiamine derivatives have been synthesized.

Among them, there are, as an active vitamin $B_1$ compound having a rapid and prolonged vitamin $B_1$ activity, commerically available S-acylthiamine derivatives, such as S·O-diacetylthiamine, S·O-dibenzoylthiamine (cf. U.S. Patent No. 2,752,348), and S-benzoylthiamine-O-monophosphate (cf. U.S. Patent No. 3,064,000) and thiamine disulfide derivatives, such as thiamine propyl disulfide (TPD) (cf. U.S. Patent No. 2,833,768) having the following formula

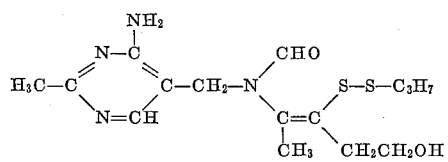

thiamine - 8 - (methyl-6-acetyldihydrothioctate)-disulfide (TATD) (cf. U.S. Patent No. 3,098,856), and O-benzoyl thiamine disulfide (BTDS) (cf. U.S. Patent No. 3,-109,000).

It is proposed that by the reaction of thiol-type thiamines and, for example, ethyl chlorocarbonate, S-carbalkoxy derivatives (cf. U.S. Patent No. 3,158,613) and O·S-dicarbalkoxy derivatives (cf. Brit. Patent No. 944,-641) can be obtained and that for obtaining these carbonyloxy derivatives, phosgene in alcohol can be used instead of an alkyl halo carbonate (cf. Japanese patent publication No. 20,166/1964).

On the other hand, hydroxyethylthiamine (HET) shown by the following formula

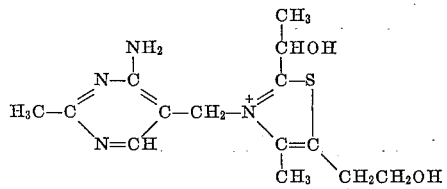

having an α-hydroxyethyl group at the 2-position of the thiazolium ring was synthesized for the first time early in 1958 by Krampitz et al. (J. Am. Chem. Soc., 80, 5893–94 (1958)) and from the consideration that the compound is an effective intermediate for thiamines, various studies have been made (Goedde: Intern. Z. Vitaminforsch., 33, 18–40 (1963)).

According to the configuration of α-hydroxyethyl group, optically active HET and nonactive HET are present.

An object of the present invention is to provide thiol-type thiamine derivatives of Formula I having unexpectedly excellent vitamin $B_1$ activity as compared with thiamine and its known derivatives.

Another object of this invention is to provide novel thiol-type thiamine derivatives showing rapid and prolonged vitamin $B_1$ activity. A further object of this invention is to provide active vitamin $B_1$ agents suitable for oral administration.

A further object of the invention is to provide compositions of matter containing thiol-type thiamine derivatives which can be rapidly absorbed from the intestinal canal and when orally administered, a much higher (twice as high as TPD) level of vitamin $B_1$ in blood than by thiamine propyl disulfide (TPD) known as typical active vitamin $B_1$ agent is maintained for a long time.

Carbothiamine and carbohydroxyethylthiamine shown by Formula I may be prepared in a variety of different ways of which the more important can be expressed generically as comprising the interaction of basic salts of thiol-type thiamine or thiol-type hydroxyethyl thiamine (HET) represented by the Formula II:

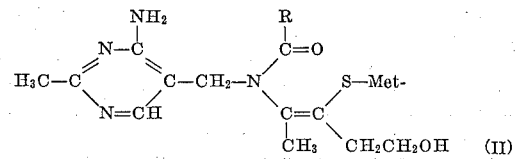

(II)

wherein R has the same significance as designated above, and Met. is a hydrogen atom, an alkali metal, ammonium or other basic radical with carbonyl dihalogenide represented by the formula: $COX_2$ (wherein X is a chlorine atom or a bromine atom). The reaction may be carried out in a suitable solvent, such as water, lower alkanols, chloroform, tetrahydrofuran, dioxane, acetone, or a mixture thereof as well as carbonyl dihalogenide itself, but water is most preferable. Generally speaking, carrying out the reaction in dilute solution may afford better results.

The starting compounds, thiol-type compounds of Formula II, may be prepared by reacting the mineral acid salts of thiazolium-type thiamine or hydroxyethyl thiamine (HET) with alkaline substances such as an alkali metal, an alkali metal hydroxide, an alkali metal alkoxide, an alkali carbonate and ammonium hydroxide according to a conventional manner.

The reagent, carbonyl dihalogenide (preferably phosgene) may be used in gaseous or liquid state, or as a solution of inert solvent, such as benzene or chloroform, about equimolar amount or more relative to the starting material II in aqueous solvent and nearly equimolar amount in non aqueous solvent, such as alcohol, acetone, chloroform, dioxane and tetrahydrofuran.

Although the optimum reaction temperature should be based on the employed reagent and solvent, a temperature from −10° C. to 10° C. is normally adopted in order to prevent evaporation of the carbonyl dihalogenide and any side reaction.

The reaction time is usually up to 2 hours, preferably up to 1 hour. Occasionally rapid reaction takes place as soon as the starting material and the reagent are mixed, according to the properties of the reagent and solvent selected.

The addition of an acid combinable agent, such as alkali hydroxide, alkali carbonate, ammonium hydroxide and triethylamine to the reaction mixture during the reaction process affords better results because the pH of the reaction mixture tends to get acidic when an aqueous solvent is employed, and thiol-type thiamine derivatives II tend to become thiazolium-type in acidic conditions.

When lower alcohols are employed as a solvent, the reaction should be carried out at a temperature lower than −20° C. to prevent the interaction of carbonyl dihalogenide and the lower alcohols.

When the reaction is carried out at a temperature lower than −10° C., di-thiamine-carbonates represented by Formula III:

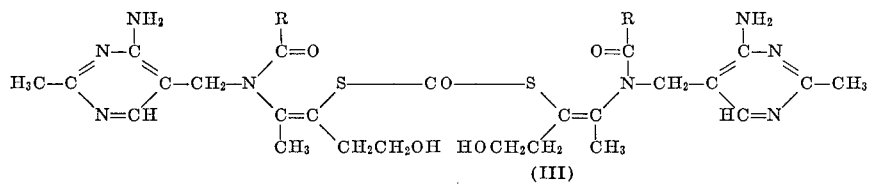

(III)

wherein R has the same significance as designated above, are produced in the reaction mixture. This Compound III is unstable under neutral or basic conditions whereby it turns promptly to the above-mentioned thiol-type thiamine derivatives of Formula I and thiamine or hydroxyethyl thiamine (HET). However, under acidic conditions, this Compound III is stable and can be isolated according to a per se conventional manner. From thus obtained di-thiamine-carbonates of Formula III carbothiamine or carbohydroxyethylthiamine shown by Formula I can be obtained by adding basic substances, such as alkali hydroxide, alkali carbonate, ammonium hydroxide, etc. and adjusting the solution from neutral to basic.

Therefore, a further object of the present invention is to provide a process for the production of di-thiamine carbonates of Formula III and to provide a process for the production of carbothiamine or carbohydroxyethylthiamine of Formula I from the di-thiamine carbonates of Formula III.

The recovery of thus prepared carbothiamine or carbohydroxyethylthiamine shown by Formula I from the reaction solution can be readily accomplished according to a conventional manner. For instance, the product is extracted with an organic layer or reaction mixture is concentrated after washing it.

Thus obtained thiol-type thiamine derivatives I may be refined by means of recrystallization from water, lower alcohols and ethylene dichloride, or by means of treatment with mineral acids such as hydrochloric acid in the course of recovery process whereby the mineral acid salts suitable for purification and crystallization are obtained.

Above described Formula I, II and III each represents the derivative of thiamine when R is hydrogen atom, and the derivative of hydroxyethyl thiamine (HET) when R is α-hydroxyethyl radical, in which optically active product is obtained if optically active starting compound is used. No racemization is seen to occur in the reaction processes. The thiol-type cyclic thiamine derivatives of Formula I and non-toxic organic and inorganic salts thereof have vitamin $B_1$ activity. They are rapidly absorbed from intestinal canal and maintain high vitamin $B_1$ level (about twice as high as TPD) in blood for a long time after oral administration.

Animal and clinical test data of compounds according to the present invention are shown in Tables I to VII in contrast with thiamine chloride hydrochloride and a commercially available typical active Vitamin $B_1$ agent, thiamine propyl disulfide (TPD) and S·O-dibenzoylthiamine.

In these tables, the compounds designated by an asterisk (*) are products of the present invention.

TABLE I.—CHANGES OF VITAMIN $B_1$ LEVEL IN BLOOD AFTER ORAL ADMINISTRATION (ANIMAL TEST)

| Time (hours) | Vitamin $B_1$ concentration in blood (μg./dl.) | | | | | | |
|---|---|---|---|---|---|---|---|
| | 0 | 0.5 | 1 | 3 | 5 | 8 | 24 |
| Thiamine chloride hydrochloride | 29.8 | 31.5 | 35.1 | 42.0 | 40.2 | 39.3 | 34.8 |
| Thiamine propyl disulfide | 27.6 | 61.8 | 65.2 | 55.1 | 50.8 | 40.7 | 29.1 |
| Carbothiamine* ((I): R=H) | 25.5 | 70.6 | 78.9 | 75.4 | 61.0 | 54.6 | 32.3 |

Test dosage: Amount equivalent to 5 mg. of thiamine chloride hydrochloride per kilogram of body weight.
Mode of administration: Oral.
Test animals: Rabbits.

TABLE II.—CHANGES OF VITAMIN $B_1$ LEVEL IN BLOOD AFTER ORAL ADMINISTRATION (ANIMAL TEST)

| Time (hours) | Vitamin $B_1$ concentration in blood (μg./dl.) | | | | | | |
|---|---|---|---|---|---|---|---|
| | 0 | 0.5 | 1 | 3 | 5 | 8 | 24 |
| Thiamine chloride hydrochloride | 21.5 | 27.3 | 28.0 | 38.5 | 41.2 | 35.2 | 20.0 |
| Dibenzoyl thiamine | 25.4 | 51.9 | 59.9 | 70.5 | 61.3 | 52.8 | 27.6 |
| Thiamine propyl disulfide | 24.9 | 93.6 | 107.0 | 84.4 | 73.9 | 62.9 | 24.8 |
| Carbothiamine* ((I): R=H) | 23.6 | 145.0 | 158.2 | 160.1 | 142.5 | 116.6 | 34.3 |

Test dosage: Amount equivalent to 10 mg. of thiamine chloride hydrochloride per kilogram of body weight.
Mode of administration: Oral.
Test animals: Rabbits.

TABLE III.—CHANGES OF VITAMIN $B^1$ LEVEL IN BLOOD AFTER ORAL ADMINISTRATION (ANIMAL TEST)

| Time (hours) | Vitamin $B_1$ concentration in blood (μg./dl.) | | | | | | |
|---|---|---|---|---|---|---|---|
| | 0 | 0.5 | 1 | 3 | 5 | 8 | 24 |
| Thiamine chloride hydrochloride | 25.7 | 33.3 | 36.6 | 39.4 | 43.4 | 39.7 | 35.9 |
| Thiamine propyl disulfide | 27.1 | 163.0 | 200.0 | 190.0 | 132.0 | 102.0 | 44.3 |
| Carbothiamine* ((1: R=H) | 26.2 | 291.0 | 343.0 | 243.0 | 211.0 | 191.0 | 52.5 |

Test dosage: Amount equivalent to 20 mg. of thimaine chloride hydrochloride per kilogram of body weight.
Mode of administration: Oral.
Test animals: Rabbits.

TABLE IV.—THE AMOUNT OF VITAMIN B₁ EXCRETED IN URINE AFTER ORAL ADMINISTRATION

| Test dosage equivalent to thiamine chloride hydrochloride | Vitamin $B_1$ amount in urine (mg.)[1] | | |
| --- | --- | --- | --- |
| | 10 mg. | 25 mg. | 50 mg. |
| Thiamine chloride hydrochloride | 0.4 | 0.6 | 1.2 |
| Thiamine propyl disulfide | 1.6 | 3.2 | 8.6 |
| Carbothiamine* ((I): R=H) | 2.0 | 4.9 | 11.3 |

[1] Measured 6 hrs. after administration.
Mode of administration: Oral.
Test subjects: Adult human (♂).

TABLE V.—CHANGES OF VITAMIN B₁ LEVEL IN BLOOD AFTER INTRAVENOUS INJECTION (ANIMAL TEST)

| Time (hours) | Vitamin $B_1$ concentration in blood (µg./dl.) | | | | |
| --- | --- | --- | --- | --- | --- |
| | 0 | 0.5 | 1 | 3 | 6 |
| Thiamine chloride hydrochloride | 27.6 | 275.0 | 181.0 | 67.0 | 44.0 |
| Thiamine propyl disulfide | 26.8 | 1,059.0 | 954.0 | 739.0 | 540.0 |
| Carbothiamine* ((I): R=H) | 25.8 | 412.0 | 352.0 | 250.0 | 178.5 |

Test dosage: Amount equivalent to 5 mg. of thiamine chloride hydrochloride per kilogram of body weight.
Mode of administration: Intravenous.
Test animals: Rabbits.

TABLE VI.—THE AMOUNT OF VITAMIN B₁ EXCRETED IN URINE AFTER INTRAVENOUS INJECTION) ANIMAL TEST)

| Time (hours) | Vitamin $B_1$ amount in urine (mg.) | | | |
| --- | --- | --- | --- | --- |
| | 0–1 | 1–3 | 3–6 | 6–24 |
| Thiamine chloride hydrochloride | 7.1 | 1.0 | 0.5 | 0.9 |
| Thiamine propyl disulfide | 3.4 | 1.3 | 1.0 | 2.6 |
| Carbothiamine* ((I): R=H) | 4.5 | 0.9 | 0.6 | 1.5 |

Test dosage: Amount equivalent to 5 mg. of thiamine chloride hydrochloride per kilogram of body weight
Mode of administration: Intravenous (in ear)
Test animals: Rabbits

TABLE VII.—ACUTE TOXICITY (ANIMAL TEST)

| Administration | $LD_{50}$ (mg./kg.) | |
| --- | --- | --- |
| | Intravenous | Oral |
| Thiamine chloride hydrochloride | 119 | 9,000 |
| Thiamine propyl disulfide | 320 | 2,750 |
| Carbothiamine* ((I): R=H) | 513 | 13,390 |

Test animals: Mice

Carbothiamine or carbohydroxyethylthiamine (I) and the innoxious salts thereof have no such unpleasant smell as in thiamine propyl disulfide and the homologs thereof.

As shown by the above tables, the thiol-type thiamine derivative (I) is useful as an active vitamin $B_1$ agent since the products of this invention are easily absorbed and have less toxic property. The products are used usefully for giving by oral administration a high vitamin $B_1$ level in blood as achieved by injection.

Several suitable examples for effecting the process of this invention are shown below, in which the symbol "Pyr" means a (2-methyl-4-amino-5-pyrimidyl) methyl group.

EXAMPLE 1

$$\text{Pyr}-N\begin{matrix}CHO\\ \diagdown\\ C=C\\ \diagup\quad\diagdown\\ CH_3\quad CH_2CH_2OH\end{matrix}\begin{matrix}S-Na\\ \end{matrix} \longrightarrow \text{Pyr}-N\begin{matrix}CHO\\ \diagdown\\ C=C\\ \diagup\quad\diagdown\\ CH_3\quad CH_2CH_2\end{matrix}\begin{matrix}S-CO\\ \diagdown\\ O\\ \diagup\end{matrix}$$

An aqueous solution of the sodium salt of thiol-type thiamine that has been prepared by adding 10 g. of thiamine chloride hydrochloride into 36.8 ml. of an aqueous 10% sodium hydroxide solution and allowing to stand for 30 minutes at room temperature was added with 3 g. of acid sodium carbonate and, after being cooled to 0–3° C., the mixture was added with 2 ml. of phosgene during 30 minutes with stirring. After stirring for another 30 minutes at the same temperature, the temperature of the solution was raised to room temperature to remove excess phosgene. The product was extracted four times from the reaction mixture using 100 ml. each of ethyl acetate. After drying the extract by anhydrous magnesium sulfate, the solvent was distilled off from the product under reduced pressure to give crystals. By rinsing with water and drying the crystals, 2.5 g. of the white crystals of the crude carbothiamine was obtained. When the crude carbothiamine was recrystallized from water, it showed the decomposition point of 175.5° C.

The infrared spectrum of the carbothiamine showed the absorption of C=O at 1685 cm.$^{-1}$ and the absorption of —CHO at 1660 cm.$^{-1}$. The thiochrome reaction of the carbothiamine was negative but by treating it with cysteine the reaction was changed into positive.

Analysis.—Calcd. for $C_{13}H_{16}N_4O_3S$: C, 50.61; H, 5.22; N, 18.17; S, 10.40. Found: C, 50.52; H, 5.36; N, 18.01; S, 10.35.

Into the remaining aqueous layer after extracting with ethyl acetate was added an excess of a saturated aqueous ammonium thiocyanate solution and the solution was allowed to stand for 1 hour. Thus precipitated white crystal was filtered, rinsed with water, and dried to give 3 g. of thiamine thiocyanate having the melting point of 192° C.

EXAMPLE 2

$$\text{Pyr}-N\begin{matrix}CHO\\ \diagdown\\ C=C\\ \diagup\quad\diagdown\\ CH_3\quad CH_2CH_2OH\end{matrix}\begin{matrix}S-Na\\ \end{matrix} \longrightarrow \text{Pyr}-N\begin{matrix}CHO\\ \diagdown\\ C=C\\ \diagup\quad\diagdown\\ CH_3\quad CH_2CH_2\end{matrix}\begin{matrix}S-CO\\ \diagdown\\ O\\ \diagup\end{matrix}$$

Into an aqueous solution of the sodium salt of thiol-type thiamine that has been prepared as in Example 1 using 3.0 g. of thiamine chloride hydrochloride was added gradually 3 ml. of liquid phosgene while maintaining the reaction mixture in an alkaline state by adding occasionally an aqueous sodium hydroxide solution instead of adding acid sodium carbonate as in Example 1. After the reaction was finished, the product was extracted from the reaction mixture with ethyl acetate followed by subsequent treatment as in Example 1 to give 1.8 g. of the white crystal of the carbothiamine showing the decomposition point of 173–174° C.

EXAMPLE 3

$$\text{Pyr}-N\begin{matrix}CHO\\ \diagdown\\ C=C\\ \diagup\quad\diagdown\\ CH_3\quad CH_2CH_2OH\end{matrix}\begin{matrix}S-Na\\ \end{matrix} \longrightarrow \text{Pyr}-N\begin{matrix}CHO\\ \diagdown\\ C=C\\ \diagup\quad\diagdown\\ CH_3\quad CH_2CH_2\end{matrix}\begin{matrix}S-CO\\ \diagdown\\ O\\ \diagup\end{matrix}$$

The reaction was conducted as in Example 2 by adding however 3.3 ml. of bromophosgene instead of phosgene into a solution of the sodium salt of thiol-type thiamine that has been prepared as in Example 1 using 3.0 g. of thiamine chloride hydrochloride. By treating thus obtained reaction mixture as in Example 1, 1.5 g. of the white crystal of the carbothiamine showing the decomposition point of 174–175° C. was obtained.

EXAMPLE 4

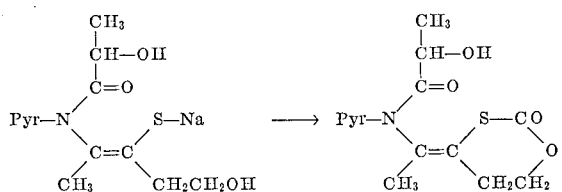

Into a mixture of 100 ml. of water and 39.4 ml. of an aqueous 1 N sodium hydroxide solution was dissolved 5 g. of hydroxyethyl thiamine (HET) chloride hydrochloride and the mixture was allowed to stand for 1 hour at room temperature. Into the solution was added dropwise 1.5 ml. of phosgene during 30 minutes with stirring cooling to 3–5° C. During this procedure, the reaction solution was maintained in alkaline state by adding an aqueous 1 N sodium hydroxide solution into it.

From the reaction solution was extracted the product four times with 100 ml. each of ethyl acetate. After drying the extract with anhydrous magnesium sulfate, the solvent was distilled off under reduced pressure and by rinsing thus obtained crystal with a small quantity of ethyl acetate, 2.5 g. of the white crystal of the crude carbohydroxyethyl thiamine was obtained. The crude product was recrystallized from ethanolic water to give the product showing the decomposition point of 195–197° C. The infrared spectrum of the carbohydroxyethyl thiamine showed the absorption band of C=O at 1705 cm.$^{-1}$ and the absorption band of —N—CO at 1650 cm.$^{-1}$. The thiochrome reaction of the carbohydroxyethyl thiamine was negative but upon treating it with cysteine, the reaction was changed into positive.

*Analysis.*—Calcd. for $C_{15}H_{20}N_4O_4S$: C, 51.12; H, 5.72; N, 15.90. Found: C, 51.15; H, 5.78; N, 15.99.

EXAMPLE 5

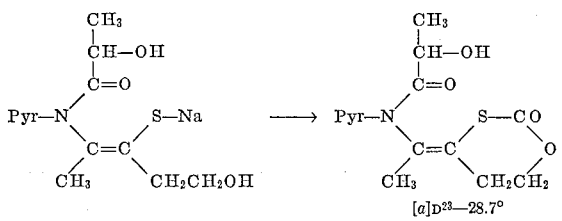

$[\alpha]_D^{23}$—28.7°

By treating 5.0 g. of d-hydroxyethyl thiamine (d-HET) chloride hydrochloride ($[\alpha]_D^{23}$+11.7° (C.=2.0, in $H_2O$)) as in Example 4, 2.6 g. of the optically active carbohydroxyethyl thiamine showing the decomposition point of 195–196° C. was obtained. The product showed the specific rotation $[\alpha]_D^{23}$ —28.7° (c.=1.2, in 0.1 N HCl).

EXAMPLE 6

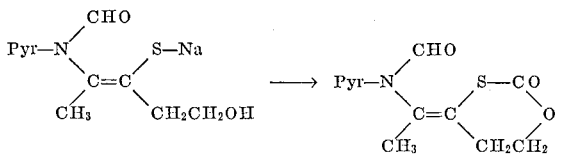

Into 30 ml. of absolute ethanol was dissolved 3 g. of the sodium salt of thiol-type thiamine. Then, under cooling to —20° C., 1 g. of phosgene in 5 ml. of benzene was gradually added dropwise into the solution, and after stirring for 10 minutes at the same temperature, the mixture was further stirred for another 10 minutes at room temperature. The NaCl deposited during the reaction was removed by filtration from the reaction solution and, after concentrating the filtrate, the residue was dissolved into water and the solution was neutralized by acid sodium carbonate. The product was extracted from the solution with ethyl acetate and the extract was, after drying with anhydrous sodium sulfate, concentrated, whereby the residue was crystallized. The crystal was recovered by filtration and rinsed with a small amount of ethanol and then ethyl acetate to give 0.3 g. of the crude carbothiamine showing the decomposition point of 174–175° C. When the crude crystal was recrystallized from ethylene dichloride, it showed the decomposition point of 182° C. Further, by treating the carbothiamine with nitric acid, the nitrate (recrystallized from methanol-ethylacetate) showing the decomposition point of 137–138° C. was obtained.

EXAMPLE 7

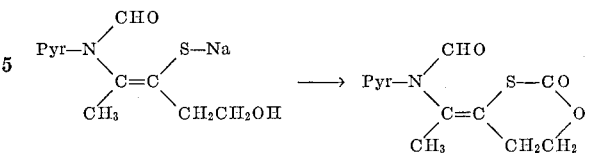

Three grams (3 g.) of the sodium salt of thiol-type thiamine was dissolved into 30 ml. of absolute methanol and into the solution was gradually added dropwise under cooling to —20° C. a solution of 1.9 g. of bromophosgene in 10 ml. of benzene. By treating thus prepared solution as in Example 6, 0.3 g. of the carbothiamine showing the decomposition point of 175° C. was obtained.

EXAMPLE 8

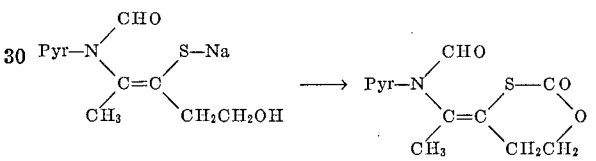

In 50 ml. of chloroform was suspended 3.0 g. of the dried sodium salt of thiol-type thiamine. Under cooling with ice and stirring, a solution of 0.7 g. of phosgene in 10 ml. of benzene was added into the suspension dropwise. Then, after continuing stirring for 1 hour at the same temperature, the solution was added with 1 ml. of triethylamine with stirring thoroughly and then further was added with 20 ml. of water with stirring thoroughly.

After separating the chloroform layer from the reaction solution and drying the layer with anhydrous magnesium sulfate, the product was concentrated and the residue was crystallized with addition of a small amount of ethyl acetate. The crystal was recovered by filtration and rinsed with ethyl acetate to give 0.9 g. of the white crystal of the carbothiamine showing the decomposition point of 173° C.

EXAMPLE 9

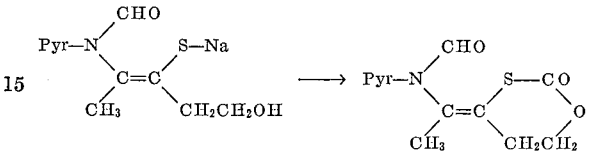

In 50 ml. of dioxane was suspended 3 g. of the sodium salt of thiol-type thiamine and into the suspension was added dropwise a solution of 1 g. of phosgene in 5 ml. of benzene under ice-cooling. The mixture was then stirred for 1 hour at the same temperature. After reaction, the solvent was distilled off under reduced pressure, and the residue was dissolved in water, and the solution was neutralized with the addition of acid sodium carbonate. From the solution was extracted the product with ethyl acetate and, after drying the extract, the product was treated with dried hydrogen chloride gas to deposite a white crystal. The crystal was recovered by filtration and recrystallized from methanol-ethyl acetate to give 1.0 g. of the hydro-chloride of the carbothiamine showing the decomposition point of 178–179° C.

*Analysis.*—Calcd. for $C_{13}H_{16}N_4O_3S \cdot HCl$: Cl, 10.30. Found: Cl, 10.22.

EXAMPLE 10

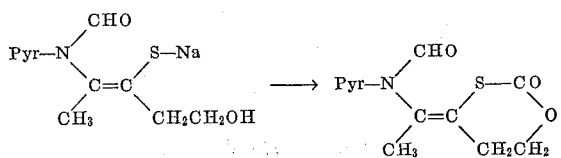

In 60 ml. of tetrahydrofuran was suspended 3 g. of the sodium salt of thiol-type thiamine and under cooling with ice water, a solution of 1.9 g. of bromophosgene in 10 ml. of benzene was added gradually into the suspension dropwise. The white crystal that had been obtained by treating the mixture as in Example 9 was recrystallized from ethylene dichloride to give 0.9 g. of the hydrochloride of the carbothiamine showing the decomposition point of 179–180° C.

EXAMPLE 11

(A)

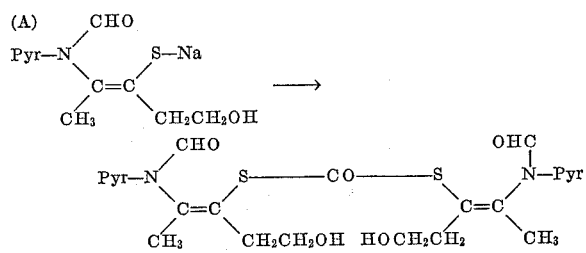

*Analysis.*—Calcd. for $C_{25}H_{36}N_8O_5S_2Cl_4 \cdot H_2O$: C, 44.05; H, 5.61; N, 16.43. Found: C, 44.12; H, 6.15; N, 16.18.

(B)

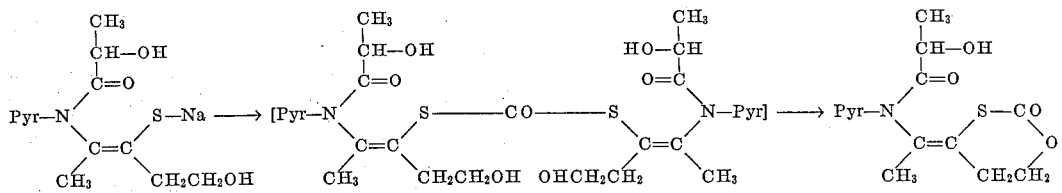

Into 10 ml. of water was dissolved 2.0 g. of the dithiamine-carbonate dihydrochloride that had been obtained in Process A and after adding 6 ml. of an aqueous 1 N sodium hydroxide solution, the solution was allowed to stand for 15 minutes at 45° C. After cooling, the product was extracted from the reaction mixture with ethylene dichloride and the extract was dried with anhydrous magnesium sulfate followed by concentration to give 0.6 g. of the product showing the decomposition point of 177–179° C.

While, the residual aqueous layer after extracting with ethylene dichloride was added with diluted hydrochloric acid to convert the pH to 6.5 and then added with 1 g. of ammonium thiocyanate to precipitate a crystal. By recovering the crystal with filtration and water-rinsing and drying it, 0.9 g. of thiamine thiocyanate was obtained.

EXAMPLE 12

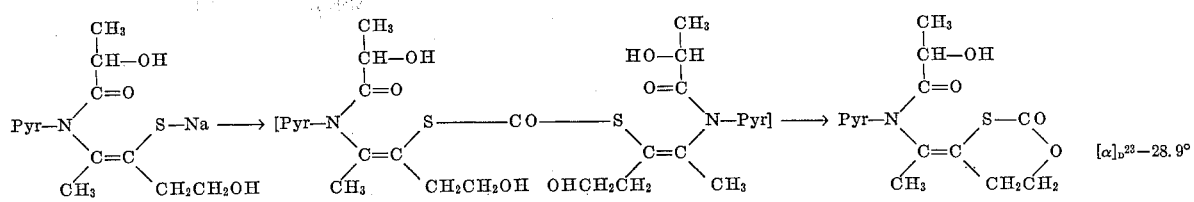

Into 48 ml. of a 10% aqueous sodium hydroxide solution was dissolved 13.5 g. of thiamine chloride hydrochloride and the solution was allowed to stand for 30 minutes at room temperature. Into the solution was added 50 ml. of ethanol and under cooling to −20° C. was added dropwise a solution of 3 ml. of phosgene in 30 ml. of benezene with stirring followed by stirring for 10 minutes at the same temperature. The reaction mixture was then added with diluted hydrochloric acid at the same temperature to adjust the pH to 2 and concentrated under reduced pressure to a half. Thus obtained solution was neutralized with the addition of acid sodium carbonate and the product was extracted five times with chloroform. After drying quickly the extract with anhydrous magnesium sulfate, the extract was added with ethanolic hydrochloric acid to be converted into an acid state and then dried by evaporating under reduced pressure. By adding acetone into the residue, the white powder of dithiamine-carbonate dihydrochloride was obtained. By recrystallizing the crude product from isobutanol, 8.4 g. of needles showing the decomposition point of 129–130° C. was obtained.

Into 16 ml. of an aqueous 10% sodium hydroxide solution was dissolved 5.0 g. of hydroxyethyl thiamine (HET) chloride hydrochloride and the solution was allowed to stand for 30 minutes at room temperature. After adding 16 ml. of ethanol to the solution, the solution was cooled to −20° C. Into the solution was added under stirring dropwise a solution of 1.5 g. of phosgene in 15 ml. of benzene and the solution was stirred for 10 minutes at the same temperature. The pH of the solution was adjusted to 2 at the same temperature with addition of diluted hydrochloric acid and the solution was concentrated to about a half under reduced pressure. It was confirmed by a paper chromatography (developed in: n-butanol:acetic acid:water=4:1:5) that besides a small amount of hydroxyethyl thiamine (HET), di-(hydroxyethyl thiamine)-carbonate was mainly present in thus obtained solution. The pH of the solution was adjusted to 9 by adding sodium carbonate and, after allowing to stand for 10 minutes, the product was extracted with ethylene dichloride. The extract was dried with anhydrous magnesium sulfate and concentrated under reduced pressure to give 1.4 g. of the carbohydroxyethyl thiamine showing the decomposition point of 194–196° C.

EXAMPLE 13

$[\alpha]_D^{23} - 28.9°$

By repeating the procedure as in Example 12 using 5 g. of d-hydroxyethyl thiamine (d-HET) chloride hydrochloride ($[\alpha]_D^{23}+11.7°$ (c.=2.0, in $H_2O$)), 1.5 g. of the optically active carbohydroxyethyl thiamine showing the decomposition point of 194° C. was obtained. The product showed the specific rotation $[\alpha]_D^{23}-28.9°$ (c.=1.2, in 0.1 N HCl).

What is claimed is:

1. A thiol-type thiamine derivative represented by the general formula

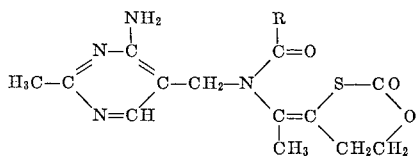

wherein R is a member selected from the group consisting of a hydrogen atom and an α-hydroxyethyl group, and in the case the R is an α-hydroxyethyl group, said formula meaning dl-form and optically active d-form and l-form.

2. A therapeutically useful acid salt of the thiol-type thiamine derivative as claimed in claim 1.

3. A thiol-type thiamine derivative represented by the formula

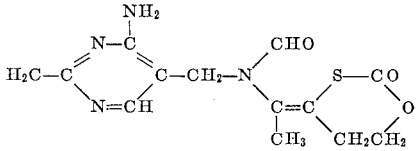

4. A thiol-type hydroxyethyl thiamine derivative represented by the formula

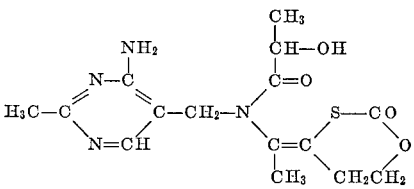

5. An optically active d-form of thiol-type hydroxyethyl thiamine derivative of claim 1.

6. The optically active l-form of thiol-type hydroxyethyl thiamine derivative of claim 1.

7. A process for preparing thiol-type thiamine derivative represented by the formula

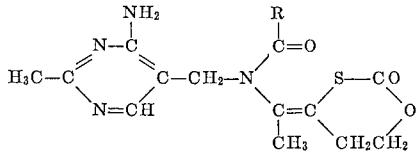

wherein R is a member selected from the group consisting of a hydrogen atom and an α-hydroxyethyl group, and in the case the R is an α-hydroxyethyl group, said formula meaning dl-form and optically active d-form and l-form, which comprises reacting a thiol-type thiamine derivative represented by the formula

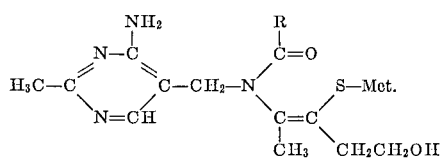

wherein R has the same significance as defined above and Met. is a member selected from the group consisting of a hydrogen atom, an alkali metal and ammonium, and a carbonyl dihalogenide represented by the formula $COX_2$ (wherein X is a member selected from the group consisting of a chlorine atom and a bromine atom) under nonacidic conditions.

8. A process in claim 7 wherein said carbonyl dihalogenide is phosgene.

9. A process in claim 7 wherein said carbonyl dihalogenide is bromophosgene.

10. A dithiamine-carbonate derivative represented by the formula

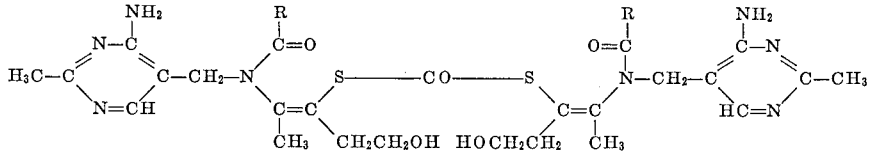

wherein R is a member selected from the group consisting of a hydrogen atom and an α-hydroxyethyl group, and in the case the R is an α-hydroxyethyl group, said formula meaning dl-form and optically active d-form and l-form.

11. A dithiamine-carbonate represented by the formula

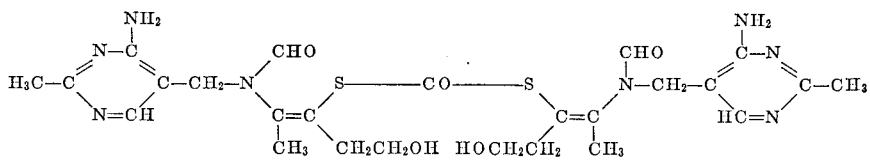

12. A di-(hydroxyethyl thiamine)-carbonate represented by the formula

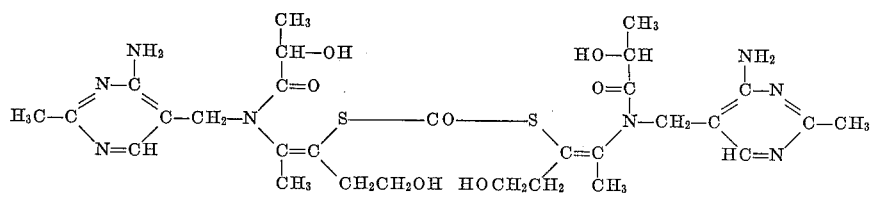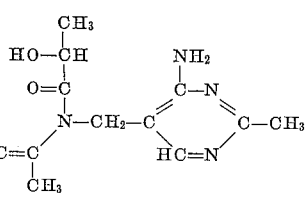

13. An optically active d-form of di-(hydroxyethyl thiamine)-carbonate of claim 10.
14. An optically active l-form of di-(hydroxyethyl thiamine)-carbonate of claim 10.
15. A process for preparing dithiamine-carbonate derivative represented by the formula

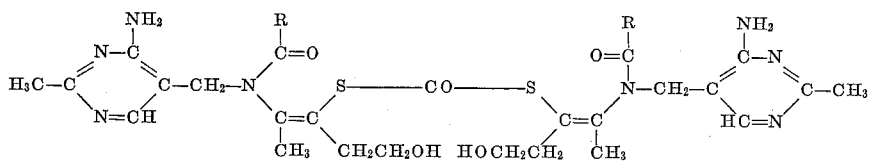

wherein R is a member selected from the group consisting of a hydrogen atom and an α-hydroxyethyl group, and in the case the R is an α-hydroxyethyl group, said formula meaning dl-form and optically active d-form and l-form, which comprises reacting a thiol-type thiamine derivative represented by the formula

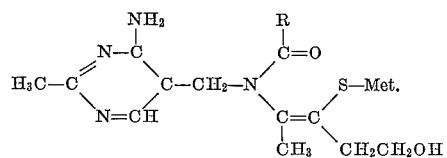

wherein R has the same significance as defined above and Met. is a member selected from the group consisting of a hydrogen atom, an alkali metal and ammonium, and a carbonyl dihalogenide represented by the formula $COX_2$ (wherein X is a member selected from the group consisting of a chlorine atom and a bromine atom) at a temperature below $-10°$ C.

16. A process in claim 15 wherein said carbonyl dihalogenide is phosgene.

17. A process for preparing thiol-type thiamine derivative represented by the formula

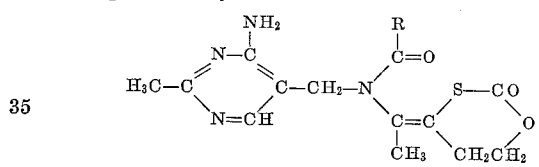

wherein R is a member selected from the group consisting of a hydrogen atom and an α-hydroxyethyl group, and in the case the R is an α-hydroxyethyl group, said formula meaning dl-form and optically active d-form and l-form, which comprises adding a basic substance selected from the group consisting of an alkali hydroxide, an alkali carbonate, and ammonium hydroxide to a dithiamine carbonate derivative represented by the formula

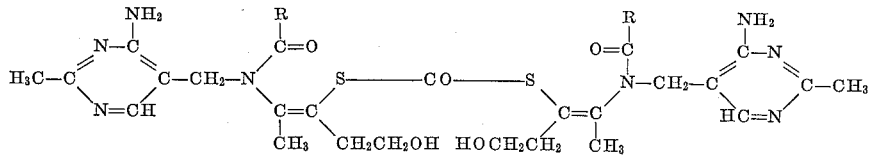

wherein R has the same significance as defined above whereby the reaction mixture is converted into from neutral to alkaline state.

References Cited

Ito et al., The Annual Report of Lakeda Laboratory, volume XIII, 1961, pages 48–50.

ALEX MAZEL, *Primary Examiner.*

MARY U. O'BRIEN, *Assistant Examiner.*